United States Patent
Lee et al.

(10) Patent No.: US 6,587,609 B2
(45) Date of Patent: Jul. 1, 2003

(54) OPTICAL SWITCHING DEVICE AND WAVELENGTH MULTIPLEXING DEVICE HAVING PLANAR WAVEGUIDE-TYPE STRUCTURE

(75) Inventors: Myung Hyun Lee, Daejon-Shi (KR); Jung Jin Ju, Daejon-Shi (KR); Jung Yun Do, Daejon-Shi (KR); Seung Koo Park, Daejon-Shi (KR); Sun Tak Park, Anyang-Shi (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/996,166

(22) Filed: Nov. 27, 2001

(65) Prior Publication Data

US 2003/0035612 A1 Feb. 20, 2003

(30) Foreign Application Priority Data

Aug. 17, 2001 (KR) ........................................ 2001-49490

(51) Int. Cl.⁷ .............................. G02B 6/35; G02B 6/26; G02B 6/122
(52) U.S. Cl. .............................. 385/16; 385/43; 385/45; 385/129; 385/132
(58) Field of Search ........................... 385/43, 45, 129, 385/132, 16, 50, 130, 131

(56) References Cited

U.S. PATENT DOCUMENTS

| | | | | |
|---|---|---|---|---|
| 3,850,503 A | * | 11/1974 | Risberg et al. ............ | 385/41 |
| 4,787,691 A | * | 11/1988 | Lorenzo et al. ............ | 385/3 |
| 5,013,113 A | * | 5/1991 | Soref ............ | 385/17 |
| 5,078,516 A | * | 1/1992 | Kapon et al. ............ | 385/129 |
| 5,177,804 A | | 1/1993 | Shimizu et al. ............ | 385/25 |
| 5,255,334 A | * | 10/1993 | Mak et al. ............ | 385/41 |
| 5,623,568 A | * | 4/1997 | Khan et al. ............ | 385/45 |
| 5,757,990 A | * | 5/1998 | Miyakawa ............ | 385/16 |
| 5,799,119 A | * | 8/1998 | Rolland et al. ............ | 385/28 |
| 5,889,898 A | * | 3/1999 | Koren et al. ............ | 385/9 |
| 6,049,643 A | * | 4/2000 | Lee et al. ............ | 385/28 |
| 6,094,516 A | | 7/2000 | Nolting et al. ............ | 385/40 |
| 6,240,233 B1 | * | 5/2001 | Weinert et al. ............ | 385/131 |
| 2001/0026669 A1 | * | 10/2001 | Nashimoto ............ | 385/129 |
| 2002/0131747 A1 | * | 9/2002 | Roberts et al. ............ | 385/132 |
| 2002/0168166 A1 | * | 11/2002 | Itoh et al. ............ | 385/129 |

OTHER PUBLICATIONS

Electronics Letters, Oct. 12, 2000, vol. 36, No. 21, pp. 1803–1804.

* cited by examiner

Primary Examiner—John D. Lee
Assistant Examiner—Daniel Valencia
(74) Attorney, Agent, or Firm—Blakely Sokoloff Taylor & Zafman

(57) ABSTRACT

The present invention makes light input/output portions being a coupling portion with an optical fiber and a Y-branch using a rib waveguide, and a bending portion using a channel waveguide, wherein the rib waveguide and the channel waveguide is connected by a tapered waveguide. So that the present invention can improve the crosstalk, loss and operating voltage characteristics.

5 Claims, 4 Drawing Sheets

OPTICAL SWITCHING DEVICE AND WAVELENGTH MULTIPLEXING DEVICE HAVING PLANAR WAVEGUIDE-TYPE STRUCTURE

BACKGROUND OF THE INVENTION

1. Field of the Invention

The present invention relates to an optical switching device, and more particularly to an optical switching device including a rib waveguide, a channel waveguide and a tapered waveguide.

2. Description of the Prior Art

In an optical communication technology and an optical device technology, a technology of manufacturing a thermo-optical digital optical switch and an arrayed waveguide grating multiplexing/demultiplexing router included in a planar waveguide-type optical device falls within a design/manufacture field of an optical device. The technology of manufacturing an optical switch may be classified as an optical switch technology of an optical device technology for an optical communication and falls within a waveguide-type digital optical switch design/manufacture technology using the thermo-optic effect of optical switch technologies.

Also, a technology of manufacturing a wavelength multiplexing device including an grating-arrayed optical waveguide may be classified as a wavelength multiplexing device technology using a wavelength division multiplex (WDM) method of an optical device technology for optical communication.

The waveguide-type optical switch includes a directional coupler, a X-switch, a two-mode interference switch, a switch using a Y-branch, etc.

The refractive indices of most of the conventional waveguide-type optical switches are periodically changed by the externally applied forces (voltage, pressure, heat, etc.) and switching is periodically changed accordingly. It is therefore impossible to use the conventional waveguide-type optical switches as a digital optical switch (DOS) that is switched as step-like.

In recent years, there has been an effort to develop a digital optical switch using a Y-branch. In order for this digital optical switch to be used in an actual optical communication switch, however, the performance of the crosstalk, the loss, etc. must be improved.

Recently, as the WDM method is used as a main method for increasing the capacity of the optical communication, an arrayed waveguide grating multiplexer/demultiplexer/router is used as a core element in the WDM optical communication system.

The arrayed waveguide grating multiplexer/demultiplexer/router multiplexes lights of various wavelengths into a single optical waveguide or demultiplexes lights of various wavelengths inputted from a single optical waveguide. Also, as the arrayed waveguide grating multiplexing/demultiplexing router allows the light of a specific wavelength to periodically reach a specific location, it has been widely used as a core element in an optical internet system, OXC and an optical exchange system. However, there is a problem that the performances of the crosstalk and the loss must be improved.

SUMMARY OF THE INVENTION

It is therefore an object of the present invention to provide an optical switching device capable of solving the above problems, wherein light input/output portions being a coupling portion with an optical fiber and a Y-branch portion are made of a rib waveguide, a bending (curving) portion is made of a channel waveguide, and the rib waveguide and the channel waveguide are connected by a tapered waveguide, in manufacturing a thermo-optic digital optical switch or an arrayed waveguide grating multiplexer/demultiplexer/router.

In order to accomplish the above object, an optical switching device according to the present invention comprises a plurality of light input portions connected to a plurality of optical fibers, respectively; a first Y branch portion for distributing lights outputted from each of the plurality of light input portions, the first Y branch portion have a plurality of Y branches; thermo-electrodes formed respectively at outsides of the Y branch to change refractive indices of the Y branch; a bending portion for controlling a path of the light selectively outputted from the first Y branch portion according to a variation of the refractive indices; a second Y branch portion for transmitting lights outputted from the bending portion; and a plurality of light output portions connected to the second Y branch portion, wherein the light input and the light output portions and the first and the second Y branches are composed of a rib waveguide, respectively; the bending portion is composed of a channel waveguide; and the first Y branch and the bending portion, and the bending portion and the second Y branch are connected by means of a tapered waveguide, respectively.

A planar waveguide-type N×N digital optical switch having a plurality of Y branches comprises light input/output portions and Y-branches which are made of a rib waveguide, and a bending portion for connecting the Y-branches which is made of a channel waveguide, wherein the rib waveguide and the channel waveguide are connected by a tapered waveguide.

At this time, the difference in the effective indices between the rib waveguide and the channel waveguide is determined by the bending degree depending on the cross angle of the waveguide. Preferably, the difference in the effective indices of the rib waveguide is about 0.4% and the difference in the effective indices of the channel waveguide is about 0.6%.

Also, a wavelength multiplexing device including an arrayed waveguide grating according to the present Invention is characterized in that light input/output portions connected to a plurality of optical fibers, respectively, and an arrayed waveguide grating having a difference of refractive indices to make bending, the light input/output portions are fabricated by a rib waveguide, the arrayed waveguide grating is fabricated by a channel waveguide, and the rib waveguide and the channel waveguide are connected by a tapered waveguide.

At this time, the difference in the effective indices between the rib waveguide and the channel waveguide is determined by the bending degree of the waveguide. Preferably, the difference in the effective indices of the rib waveguide is about 0.6% and the difference in the effective indices of the channel waveguide is about 1.0%.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
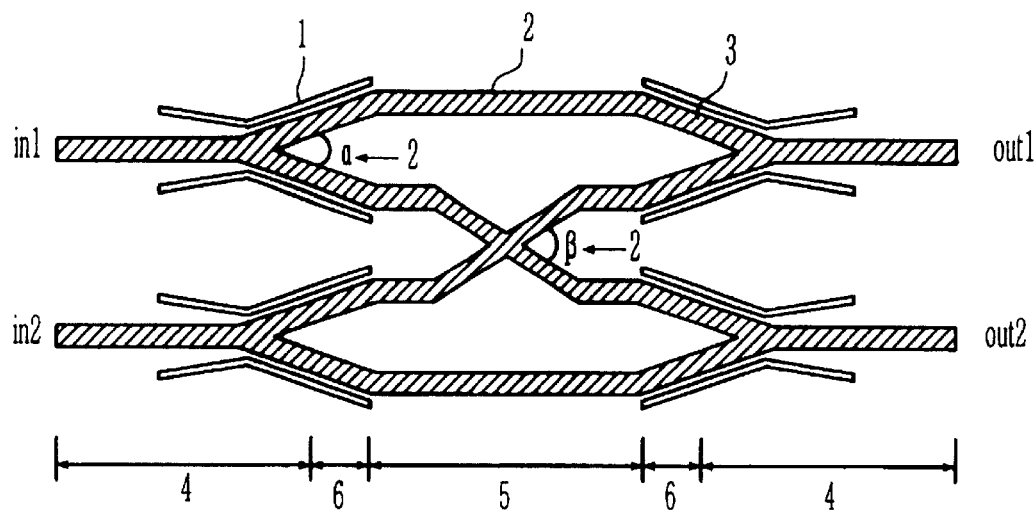
FIG. 1. is a plan view of optical switching device having planar waveguide-type structure according to one embodiment of the present invention.

The present invention will be described in detail by way of a preferred embodiment with reference to accompanying drawings, in which like reference numerals are used to identify the same or similar parts.

The present invention discloses a planar waveguide-type thermo-optic N×N digital optical switch in optical switches. In the planar waveguide-type thermo-optical optical N×N digital optical switches. light input/output portions where they are coupled and attached with optical fibers and Y-branch regions which are light coupling portions are fabricated by rib waveguides. A bending portion is fabricated by a channel waveguide so that the size of the device is reduced by enlarging a bent using the high difference of refractive indices.

As mentioned above, the light input/output portions being the coupling portion with the optical fiber are each made of the N number of rib waveguides. Therefore, the effective cross-section areas can be increased and the coupling loss with the optical fiber can be thus minimized. Also, the Y-branch portion is also made of the rib waveguide. Thus, the difference of the refractive indices can be reduced. Due to this, a mode coupling generated between the waveguides can be increased and the crosstalk can be thus improved. Further, as the bending portion is made of the channel waveguide, the difference of the refractive indices can be increased and the bending radius can be thus reduced. Due to this, as the length of the device is reduced, the size and loss of the device can be reduced.

At this time, as the light input/output portions are made of the rib waveguide in a strictly single mode and the bending portion is made of the channel waveguide in a loose single mode, the performance in the crosstalk, the loss, etc. of the optical device can be improved. Thus, if the rib waveguide being partially small in the difference of the refractive indices is applied to the channel waveguide being great in the difference in the refractive indices, the performance (loss, crosstalk, operating power, etc.) of a planar waveguide-type thermo-optical N×N digital optical switch can be improved.

Also, the present invention makes light input/output portions being a coupling portion with an optical fiber using a rib waveguide, and an arrayed waveguide grating portion for reducing the size of the device by making greater the bending by use of the high refractive indices difference using a channel waveguide, in manufacturing a planar waveguide-type arrayed waveguide grating multiplexing/demultiplexing router of optical switching devices.

As mentioned above, in the arranged waveguide grating multiplexing/demultiplexing router, the light input/output portions being the coupling portion with the optical fiber are made of the N number of rib waveguides. Therefore, the effective cross-section area can be increased and the coupling loss with the optical fiber can be thus minimized. Also, as the arrayed waveguide grating portion is made of the channel waveguide, the difference of the refractive indices can be increased and a bending radius can be reduced. In addition, as the length of the device is reduced, the size and loss of the device can be reduced.

At this time, the light input/output portions are made of the rib waveguide in a strictly single mode and the arrayed waveguide grating portion is made of the channel waveguide having a greater refractive, which does not occur reaction with neighboring waveguides. Therefore, the performance in the crosstalk, the loss, etc. of the optical device can be improved. If the rib waveguide being partially small in the difference in the refractive indices is applied to the channel waveguide being great in the difference in the refractive indices, the performance (loss, crosstalk, operating power, etc.) of a planar waveguide-type arranged waveguide grating multiplexing/demultiplexing router can be improved.

Figure 3:
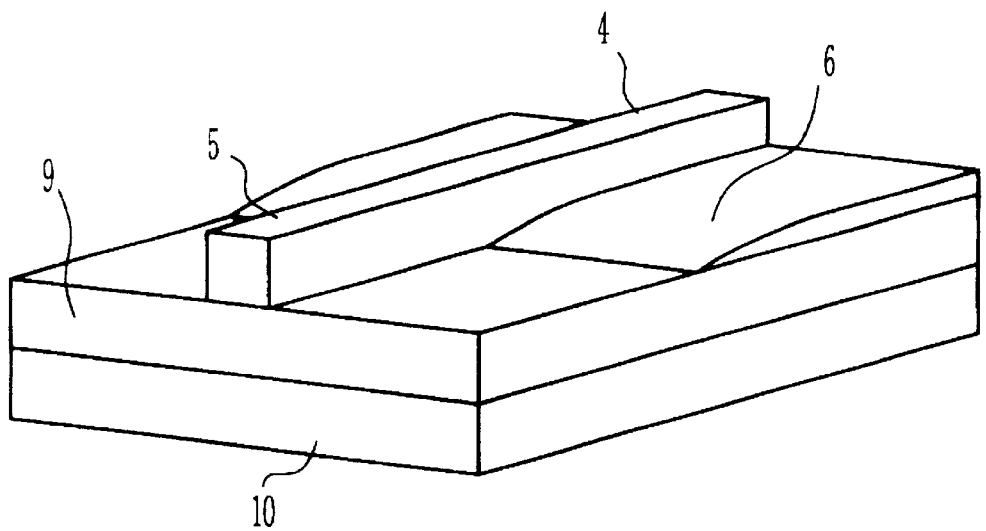
FIG. 3 is a perspective view of a portion where the rib waveguide and the channel waveguide are transferred.

FIG. 1 is a plan view of optical switching device having planar waveguide-type structure according to one embodiment of the present invention, and FIG. 3 is a perspective view of a portion where the rib waveguide and the channel waveguide are transferred.

Figure 2:
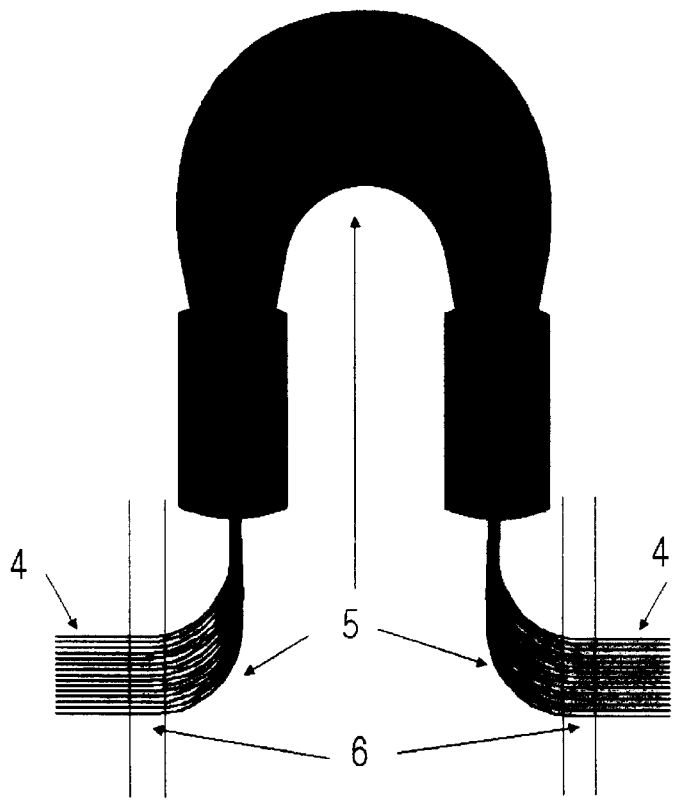
FIG. 2 is a structure of an arrayed waveguide grating multiplexer/demultiplexer/router according to one embodiment of the present invention.

Referring now to FIG. 3, a lower cladding layer 9 and a core layer are coated using a cladding material and a core material. Light input portions in1 and in2, light output portions out1 and out2 and a Y-branch portion 3 are made of a rib waveguide 4 having the effective difference of the refractive indices of about 0.4% by means of lithography, dry etching and taper etching process, and a bending portion is made of a channel waveguide 5 having the effective difference of the refractive indices of about 0.6%. The rib waveguide 4 and the channel waveguide 5 are connected by a tapered waveguide 6, as shown in FIG. 2. After the optical waveguide is manufactured, an upper cladding layer is coated and thermo-electrodes 1 are then formed.

FIG. 1 shows an example of a 2×2 optical switching device according to the present invention.

The light input portions in1 and in2 are each connected to a Y-branch 3 having two branches each separated at a given branch angle (_). Also, the light output portions out1 and out2 are also each connected to Y-branches 3 having two branches separated at a given branch angle (_).

One of the branches of each of the Y-branches each connected to the light input portions in1 and in2 is connected to one of the branches of each of the Y-branches each connected to the light output portions out1 and out2. On the other hand, the other of the branches of each of the Y-branches each connected to the light input portions in1 and in2 is intersected at a given intersection angle (_) to the other of the branches of each of the Y-branches each connected to the light output portions out1 and out2.

The light input portions in1 and in2, the light output portions out1 and out2 and the Y-branch 3 are made of the rib waveguide 4. A connection portion of the Y-branch and the Y-branch, that is, a bending portion is made of a channel waveguide 5. Also, the rib waveguide 4 and the channel waveguide 5 are connected by means of the tapered waveguide 6.

Light having a single mode has a trend to proceed in a direction where the refractive indices are great. Generally, as the temperature is increased, the refractive indices are reduced in the case of polymer. In case of silica, there is a trend that the refractive indices is increased.

If a voltage is applied to the thermo-electrodes 1 at four places inside the optical switch made of polymeric materials shown in FIG. 1, the temperature in the inside of the connected Y-branches 3 is increased to lower the refractive indices but the refractive indices in the outside of the connected Y-branches 3 is relatively increased. Therefore, the lights input to the light input portions in1 and in2 each go out to the light output portions out1 and out2, respectively. Also, a voltage is applied to the thermo-electrodes 1 at the four places outside the optical switch, the temperature in the outside of the connected Y-branches 3 is increased to lower the refractive indices but the refractive indices in the inside of the connected Y-branches 3 is relatively increased. Therefore, as the lights input to the light input portions in1 and in2 are crossed, they go out to the light output portions out2 and out1, respectively.

Figure 4:
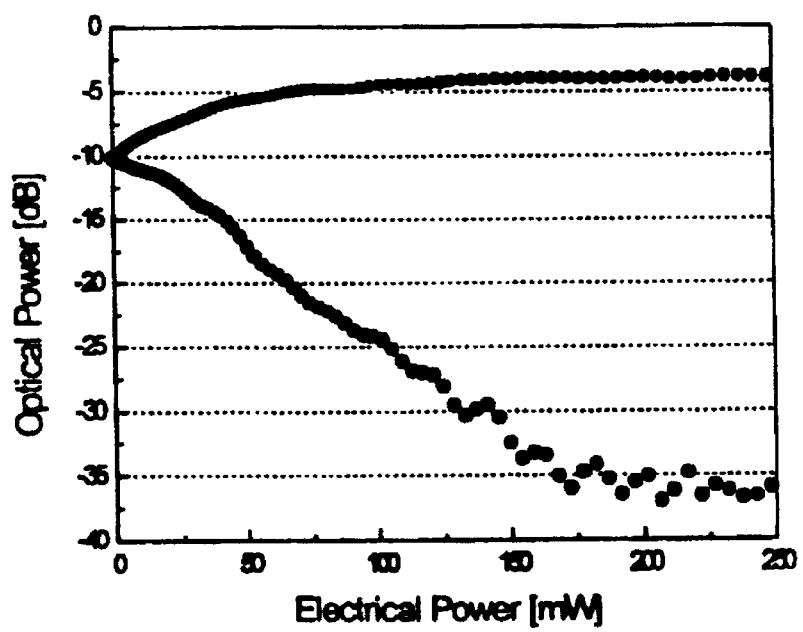
FIG. 4 is a characteristic graph showing a crosstalk characteristic and the operating voltage of the optical waveguide manufactured using the rib waveguide
Figure 5:
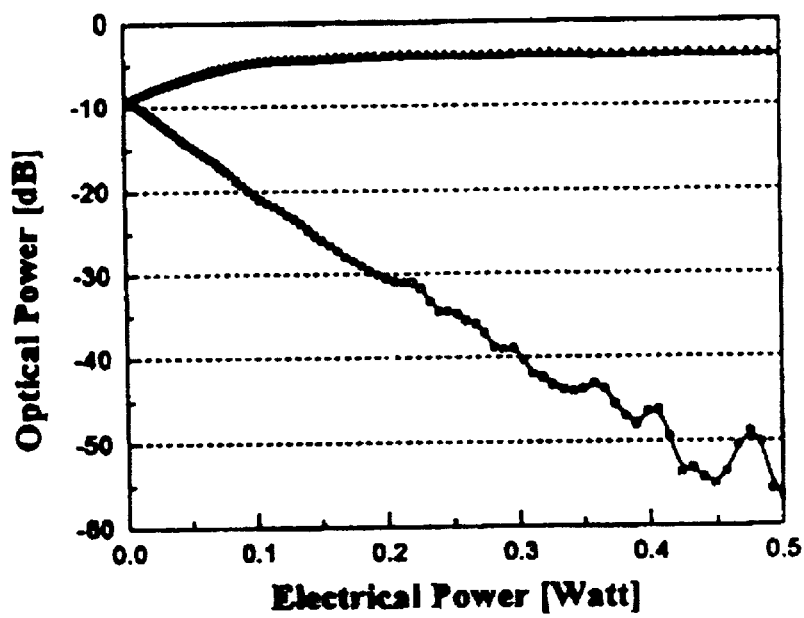
FIG. 5 is a characteristic graph showing a crosstalk characteristic and the operating voltage of the optical waveguide manufactured using the rib waveguide and the channel waveguide.

FIG. 4 is a characteristic graph showing a crosstalk characteristic and the operating voltage of the optical waveguide manufactured using the rib waveguide, and FIG. 5 is a characteristic graph showing a crosstalk characteristic and the operating voltage of the optical waveguide manufactured using the rib waveguide and the channel waveguide.

Comparing the characteristic graphs shown in FIGS. 4 and 5, it can be seen that the case of the planar waveguide-type thermo-optical 2×2 digital optical switch manufactured using the rib waveguide and the channel waveguide is much better in the crosstalk and the operating characteristic than the case manufactured using only the rib waveguide.

Another embodiment of a planar waveguide-type arrayed waveguide grating multiplexing/demultiplexing (AWG) router will be below explained.

FIG. 2 is a structure of an arrayed waveguide grating multiplexing/demultiplexing router according to one embodiment of the present invention, and FIG. 3 is a perspective view of a portion where the rib waveguide and the channel waveguide are transferred.

Similarly in the above embodiment, an underlying cladding layer and a core layer are coated using a cladding material and a core material. Light input/output portions are made of a rib waveguide 4 having the effective difference of the refractive indices of about 0.4% by means of lithography, dry etching and taper etching process, and an arrayed waveguide grating portion and a slap waveguide portion are made of a channel waveguide 5 having the effective difference of the refractive indices of about 0.6%.

The rib waveguide and the channel waveguide are connected by a tapered waveguide 6, as shown in FIG. 3. After the optical waveguide is manufactured, an upper cladding layer is coated.

In FIGS. 2 and 3, the reason that the effective refractive indices are difference is that the bending degree in the device itself is basically different. Therefore, the difference of the effective refractive indices can be controlled in order to adopt the size and the performance of the device depending on the bending degree of the device.

Figure 6:
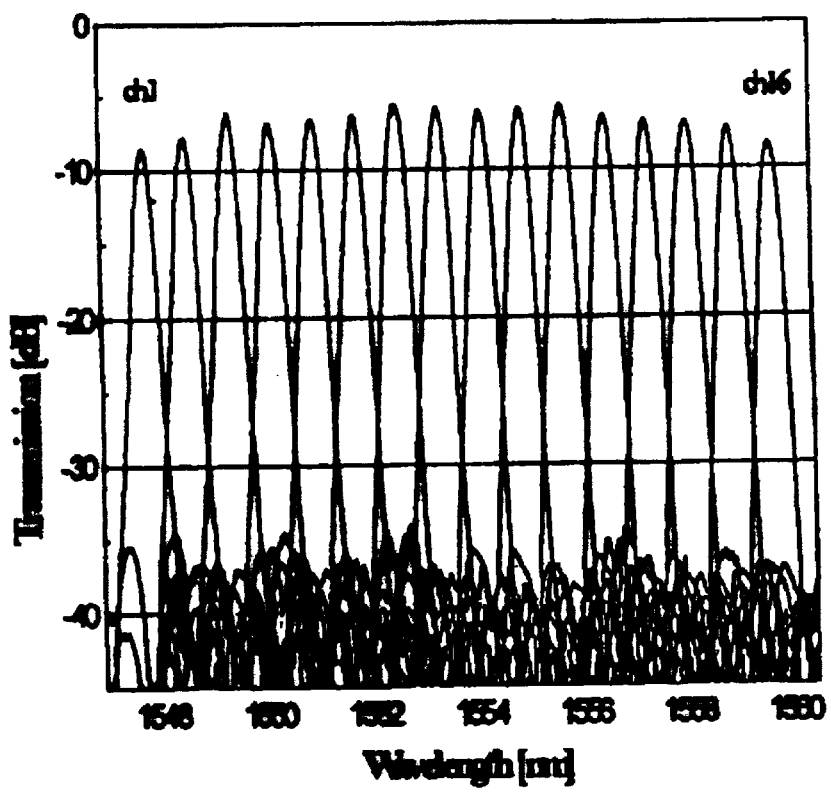
FIG. 6 is a characteristic graph showing the transparency and loss characteristics of an arrayed waveguide grating multiplexing/demultiplexing router manufactured using the rib waveguide.
Figure 7:
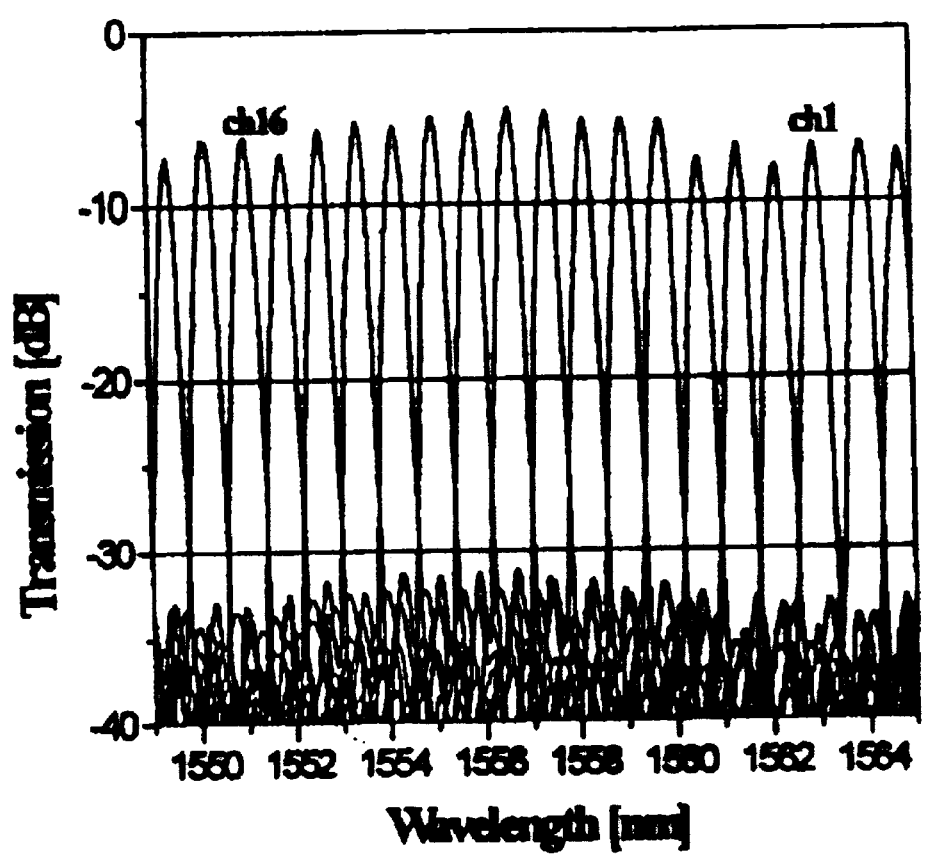
FIG. 7 is a characteristic graph showing the transparency and loss characteristics of an arrayed waveguide grating multiplexing/demltiplexing router manufactured using the rib waveguide and the channel waveguide.

FIG. 6 is a characteristic graph showing the transparency and loss characteristics of an arrayed waveguide grating multiplexing/demultiplexing router manufactured using the rib waveguide, and FIG. 7 is a characteristic graph showing the transparency and loss characteristics of an arrayed waveguide grating multiplexing/demultiplexing router manufactured using the rib waveguide and the channel waveguide.

Comparing the characteristic graphs shown in FIGS. 6 and 7, it can be seen that the case of the arrayed waveguide grating multiplexing/demultiplexing router manufacturing using the rib waveguide and the channel waveguide is improved by about 0.4 dB in the optical loss, compared to the case manufactured using only the rib waveguide. This is a result of reduction in the coupling loss with an optical fiber as the size of the effective cross-section of the rib waveguide is increased. Also, it can be seen that the crosstalk is improved by 2–3 dB, which shows that a strictly single mode is formed by means of the rib waveguide in the input portions.

As can be understood from the above description, the present invention makes light input/output portions in a strictly single mode using a rib waveguide and a bending portion in a loose single mode using a channel waveguide, wherein the rib waveguide and the channel waveguide are connected by a tapered waveguide. Therefore, the present invention can effectively improve the characteristics such as the crosstalk, the loss, the operating voltage, etc.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed are:

1. A wavelength multiplexing device having planar waveguide-type structure comprising:
    light input/output portions connected to a plurality of optical fibers, respectively; and
    an arrayed waveguide grating having a difference of refractive indices to make bending,
    wherein the light input/output portions are fabricated by a rib waveguide;
    the arrayed waveguide grating is fabricated by a channel waveguide; and
    said rib waveguide and said channel waveguide are connected by a tapered waveguide.

2. The wavelength multiplexing device having planar waveguide-type structure according to claim 1, wherein the difference of the effective refractive indices between said rib waveguide and said channel waveguide is determined by the bending degree of said waveguide and wherein, preferably, the effective refractive indices of said rib waveguide is about 0.6% and the effective refractive indices of said channel waveguide is about 1.0%.

3. An optical switching device having planar waveguide-type structure for switching lights transmitted through optical fibers comprising:
    a plurality of light input portions connected to a plurality of optical fibers, respectively;
    a first Y branch portion for distributing lights outputted from each of the plurality of light input portions, the first Y branch portion have a plurality of Y branches;
    thermo-electrodes formed respectively at outsides of the Y branch to change refractive indices of the Y branch;

a bending portion for controlling a path of the light selectively outputted from the first Y branch portion according to a variation of the refractive indices;

a second Y branch portion for transmitting lights outputted from the bending portion; and a plurality of light output portions connected to the second Y branch portion, wherein the light input and the light output portions, and the first and the second Y branches are composed of a rib waveguide, respectively;

the bending portion is composed of a channel waveguide; and the first Y branch and the bending portion, and the bending portion and the second Y branch are connected by means of a tapered waveguide, respectively.

4. The optical switching device having planar waveguide-type structure according to claim 3, wherein the difference of the effective refractive indices between said rib waveguide and said channel waveguide is determined depending on the bending degree.

5. The optical switching device having planar waveguide-type structure according to claim 3, wherein the difference of the effective refractive indices between said rib waveguide and said channel waveguide is determined by the bending degree depending on the cross angle of the waveguide and wherein, preferably, the effective refractive indices of said rib waveguide is about 0.4% and the effective refractive indices of said channel waveguide is about 0.6%.

* * * * *